No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES: INVENTOR
George G. Schroeder
BY
Attorney

No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES:

INVENTOR
George G. Schroeder
BY
Attorney

No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES:

INVENTOR
George G. Schroeder
By A. L. Glascock
Attorney

No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES:

INVENTOR
George G. Schroeder

BY
Attorney

No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES:

INVENTOR
George G. Schroeder
BY
Attorney

No. 841,580.  
PATENTED JAN. 15, 1907.  
G. G. SCHROEDER.  
AERIAL TRANSPORTATION SYSTEM FOR VESSELS.  
APPLICATION FILED JUNE 15, 1904. RENEWED JUNE 25, 1906.

Witnesses  
Inventor  
George G Schroeder  
By A. E. Glascock  
Attorney No. 841,580. PATENTED JAN. 15, 1907.
G. G. SCHROEDER.
AERIAL TRANSPORTATION SYSTEM FOR VESSELS.
APPLICATION FILED JUNE 15, 1904. RENEWED JUNE 25, 1906.

WITNESSES:

INVENTOR
George G Schroeder

BY
Attorney

UNITED STATES PATENT OFFICE.

GEORGE G. SCHROEDER, OF WASHINGTON, DISTRICT OF COLUMBIA.

AERIAL TRANSPORTATION SYSTEM FOR VESSELS.

No. 841,580.           Specification of Letters Patent.           Patented Jan. 15, 1907.

Application filed June 15, 1904. Renewed June 25, 1906. Serial No. 323,344.

*To all whom it may concern:*

Be it known that I, GEORGE G. SCHROEDER, a citizen of the United States, residing at Washington, in the District of Columbia, have invented certain new and useful Improvements in Aerial Transportation Systems for Vessels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to aerial transportation systems; and it consists in the novel construction and arrangement of its parts, as hereinafter shown and described.

The object of the invention is to provide such a system especially adapted to be used for loading or unloading ships, boats, and floating craft of all kinds. The device may be used to advantage in such places where the ships, boats, and craft, on account of shoal water, marsh, sand-bars, or other causes, by reason of lack of wharf facilities, cannot get near the shore.

The device consists of a cable or track way which is supported by pontoons or other buoyant supports in deep water and by poles resting on the bottom in shallow places. The said cable is adapted to sustain the weight of a series of cars, carriers, or other conveyances fitted with grapple-hooks or other attaching devices and which are propelled by an electric motor. A current-wire extends parallel to said cable and is adapted to supply the electric current to the said motors. At the shore end the cable is anchored or otherwise secured at a fixed point, while at the ship end the cable is provided with a means which is automatically adapted to keep the cable taut while the ship raises and lowers with the tide and also if it should rock by reason of rough water. The cable extends substantially in a straight horizontal line from the ship to the shore, and at the shore end there is an inclined elevated trackway provided, which communicates with the cable and upon which the cars pass from the cable. This elevated trackway describes a loop, one end of which rests upon the incoming cable and the other end upon the outgoing cable. Under the loop there is a guide rod or wire which connects at both ends with the current-wire under the cable, but is insulated therefrom and is adapted to guide the trolley-wheel of the car around the loop. At the ship end a similar elevated trackway is provided which passes around the deck of the vessel and within easy reach of the hatchways, so that the cargo may be lifted through the hatches and loaded upon the cars and forwarded to shore.

The tension device for the cable and the current-wire consists of pulleys, which are mounted upon sliding blocks and to which are attached cables which pass over rollers and have weights, such as anchors, attached to their other ends. These weights always remaining pendent impart sufficient tension to the cable and current-wire. The supports for the cable along the way are provided with grooved wheels, over which the cable passes and which permit the cable to work back and forth for a short distance to compensate for the rise and fall of the ship with the tide. In the system of supports those nearest the ship are erected upon pontoons or other buoyant supports, while those farther inshore are supported upon poles which rest upon the bottom in shallow places. The object of this arrangement is that the supports resting upon the bottom cannot move vertically with the tide, while the pontoons do move vertically with the tide. Consequently as the ship rises and falls with the tide that end of the cable is carried up and down, and the cable, passing over the supports upon the pontoons, merges into the main portion of the cable at a greater angle than it would if the cable extended directly from the ship to the supports resting upon the solid bottom. Thus downward bowing of the cable is prevented. As the pontoons above referred to float upon the water and as these pontoons may be rocked by the waves or given a slight twisting movement in a horizontal plane, the cable-supports erected thereon are provided with a ball-and-socket joint, which permits the said pontoons to describe the movements above referred to without causing the said supports to rock or twist. By providing such a joint the supports remain in constant vertical positions and are held in place by the cable and the guy-cable, as will be hereinafter explained.

In the accompanying drawings.

This system consists of a series of poles or cable-supports 1, which extend from the ship 2 to the shore. Some of these poles rest upon the bottom of the harbor or water, while others may be located in marshes on rocks, sand-bars, and shore, and those nearest the ship are mounted upon pontoons or other buoyant supports 3, the height of the line being adjusted from shore to boat to suit the contour of land and water by the use of telescopic poles or supports.

Figures 11, 12:
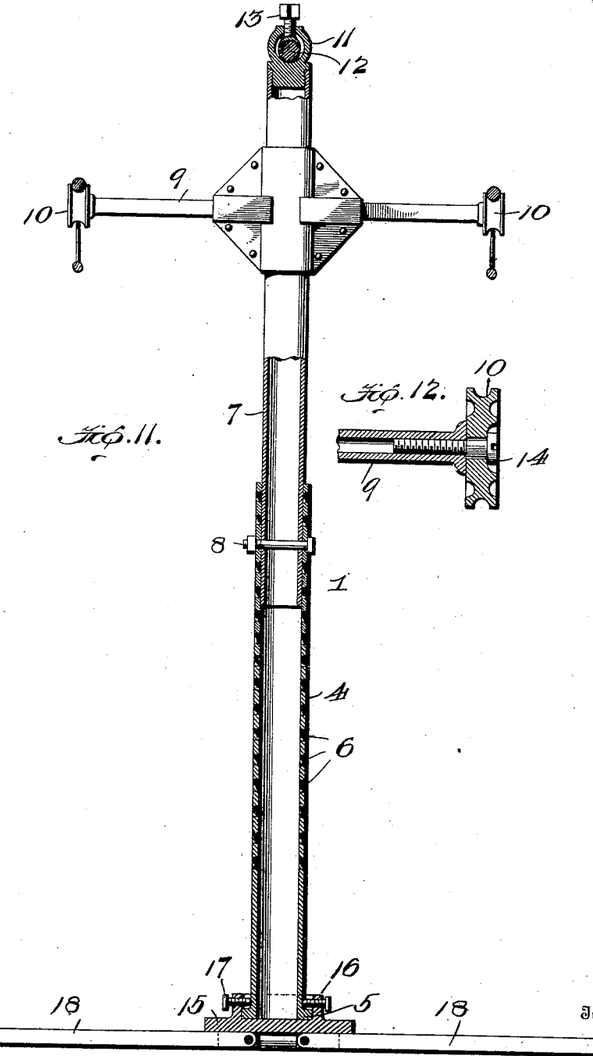
Fig. 11 is a side elevation, partly in section, of a telescopic pole used in the system.
Fig. 12 is a sectional view of a wheel at the end of the pole-arm.
Figure 13:
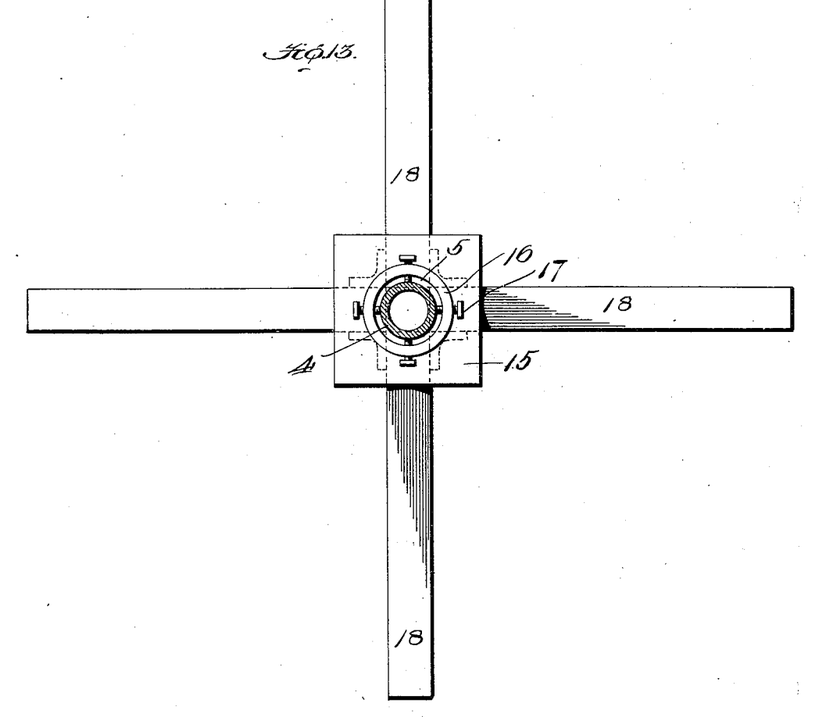
Fig. 13 is a horizontal sectional view of a pole used in the system.

By referring to Fig. 11, the form of cable-support as used upon a stationary foundation is shown. This support consists of the lower tubular section 4, which is provided at its lower end with the external flange 5. The said section is also provided with the perforations 6 6. The upper tubular section 7 telescopes into the upper end of the section 4 and is adjustably attached thereto by means of the cross-bolt 8, which passes through opposite perforations in the section 7 and also through any desired perforations 6 6 in order that the height of the support in its entirety may be regulated to meet existing conditions.

The cross-arm 9 is attached to the upper section 7 and has journaled at each end a wheel or roller 10. Said wheels 10 are adapted to support the cable and current-wire, as will be hereinafter explained.

Figure 1:
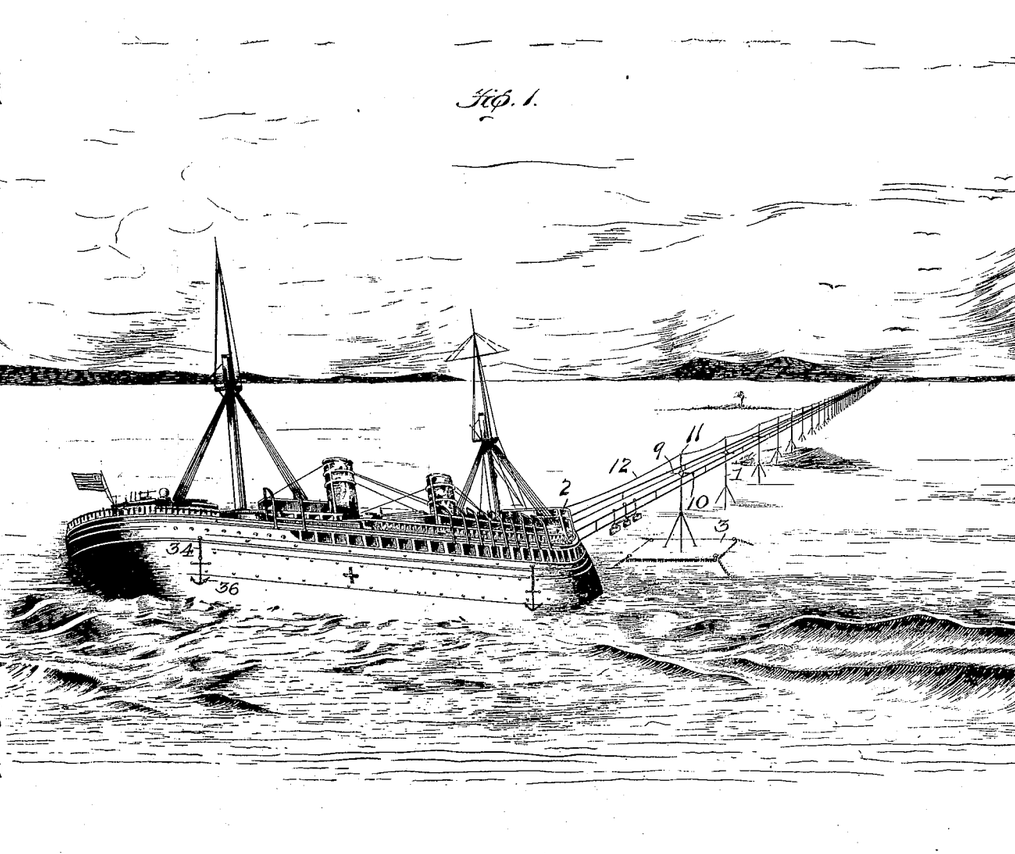
Figure 1 is a perspective view of my system connecting a ship with the shore.

The top of the section 7 is provided with an eye 11, through which a guy-cable 12 passes and which extends from the ship 2 to the shore, as shown in Fig. 1, and braces all of the poles 1. The set-screw 13 passes through said eye 11 and is adapted to impinge at its lower end the cable 12 to the pole, and thus attach the said cable to the pole. The wheels 10 are journaled upon the pins 14, which are screwed into the ends of the cross-arm 9.

For those poles 1 that rest upon a solid foundation, and even in some instances where pontoons are used, a plate 15 is provided, which has upon its upper surface a flange 16, provided with set-screws 17. The flange 5 of the lower pole-section slips within the flange 16, and the set-screws bind the lower end of the pole to the plate 15. Upon its under side the plate 15 is provided with a number of hinged arms 18. The said arms are so hinged to the said plate that they may swing down when the plate is elevated; but they cannot swing up higher than in a horizontal position when the plate is placed upon the ground. Consequently the said arms prevent the said plate and the pole from sinking when placed upon a soft bottom, and the said arms act as lateral braces for the pole.

Figure 14:
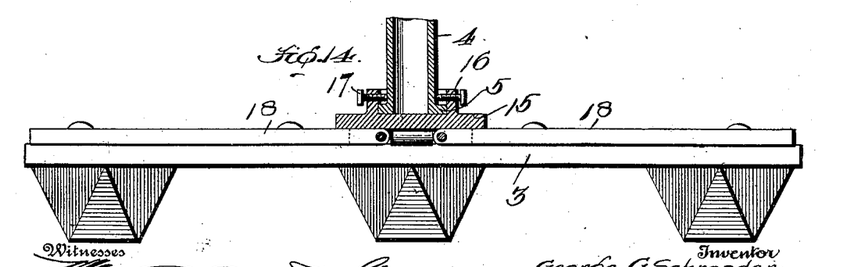
Fig. 14 is a side elevation of pontoon with pole attached.

Fig. 14 shows a pole as above described applied to a pontoon; but in some instances poles of other construction must be used upon pontoons to meet all conditions.

Figure 17:
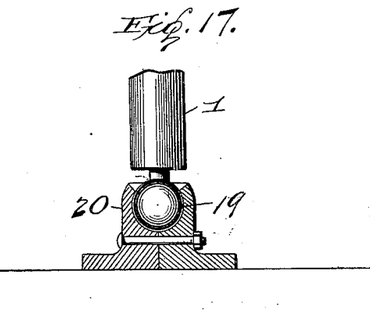
Fig. 17 is a detail view, partly in section, of a ball-and-socket pole end connection for pontoon use.

Fig. 17 shows a detail view of the lower end of a pole especially adapted for pontoon use. The pontoons are used where the water is too deep for the poles and also to keep at as constant a degree as possible the angle of the cables between the ship and the main line. As shown in the said figure, the lower end of the pole 1 is provided with a ball 19, which fits into the socket 20. Said socket in turn may be fixed to a pontoon. With this construction the pontoon may rock in the waves or may describe an auxiliary movement without rocking or twisting the pole 1, and hence there is no danger of the cable-lines becoming distorted from this cause.

The cable-track, which extends from the ship to the shore and back again, consists of the cable 21, which rests upon the wheels 10 of the poles 1. Just below said cable 21 is a parallel current-conducting wire 22, which is supported from the cable 21 by the rods 23, which are provided with the insulation 24. The cable 21 and the wire 22 are continuous—that is to say, they form a loop from the ship to the shore—and at the ship end and shore end they pass around pulleys, one of which is fixed and the other movable, so that any sag or slack may be taken up and that they may be kept taut, the wheels 10 permitting slight longitudinal movement of the cable 21 to accomplish this end.

Figure 15:
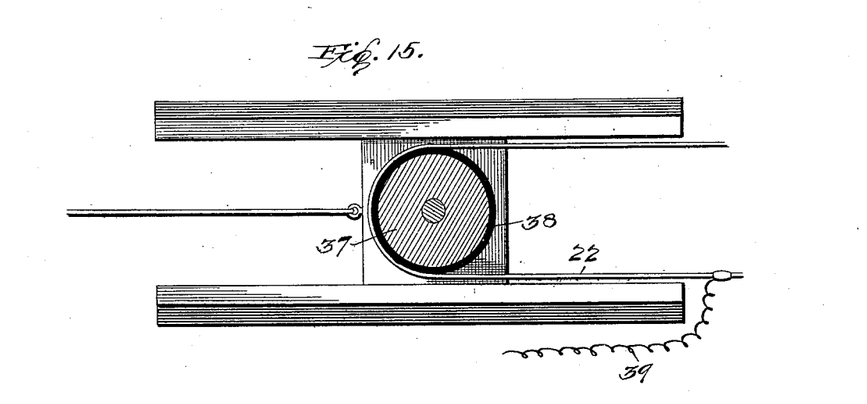
Fig. 15 is a top plan view, partly in section, of the current-wire tension device.
Figure 16:
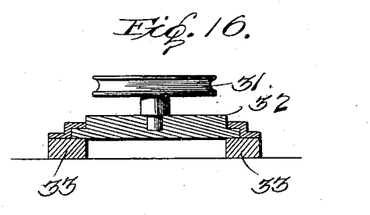
Fig. 16 is an end view of the cable-pulley and sliding block.

At the shore end the cable 21 passes around the pulley 25, which is journaled to the post 26. The wire 22 passes around an insulated wheel 27, also journaled to the said post. (The insulation of this wheel is substantially the same as that shown in Fig. 15 and which will be hereinafter explained.) The post 26 rests upon the base 28, which rests upon the ground. The guy-ropes 29 are attached to the said post near the upper end thereof and are fixed at their lower ends to anchors 30, embedded in the ground.

At the ship end the cable passes around the pulley 31. Said pulley is mounted upon the sliding block 32, which works back and forth upon the guides 33. The cable 34 is attached at one end to the block 32 and then passes over the pulley 35 and has secured to its other end a weight or anchor 36. Said weight 36 hangs suspended at all times, and thus tension is imparted to the cable 21, which keeps the same taut.

The current-wire 22 passes around the pulley 37, which is mounted on a block with tension device similar to that described for the pulley 31. The pulley 37 is provided with an insulated rim 38, (see Fig. 15,) and the wire 39 is attached at one end to the wire 22 and at its other end to the electric generator 40. Thus the current-wire 22 is kept taut and is supplied with current.

Figure 10:
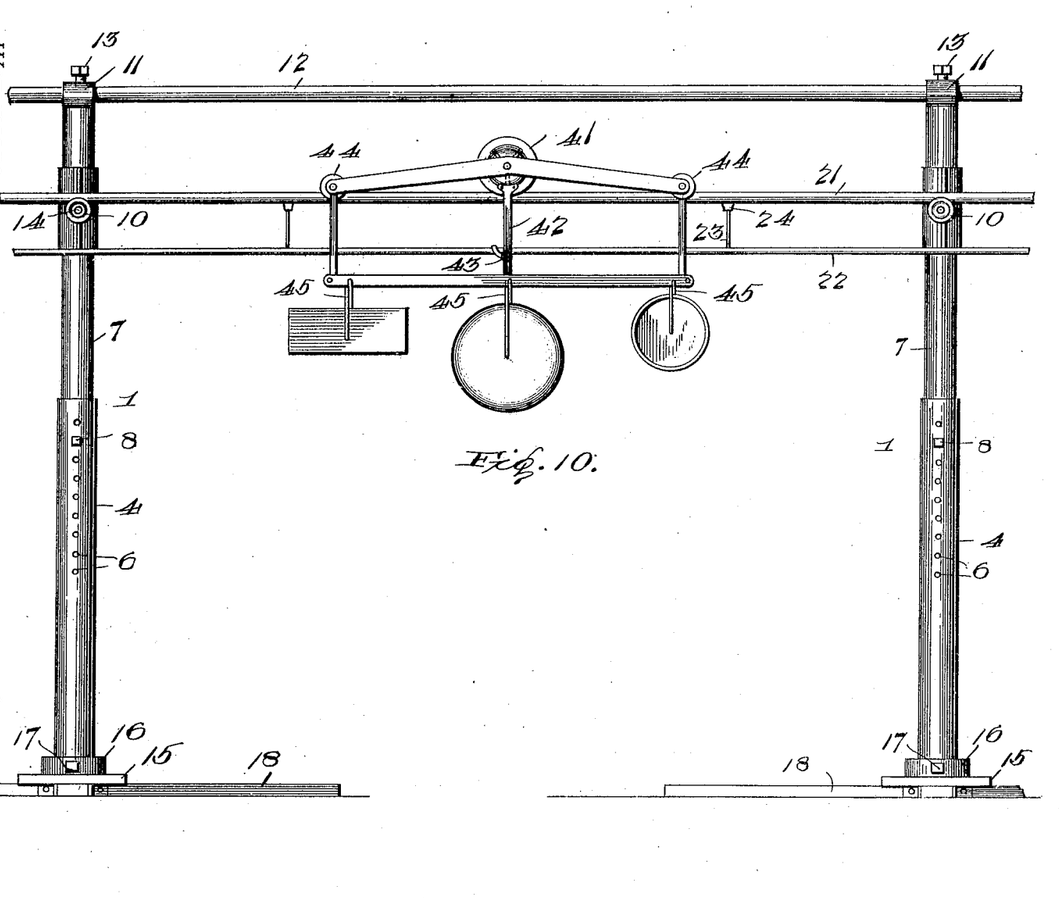
Fig. 10 is a side elevation of an intermediate section of the system, showing a motor thereon.

The conveyances that travel from the ship to the shore consist of the motors 41, (of usual construction,) that have peripheral tires that run upon the cable 21. The hanger 42 is attached at its upper end to said motor or its frame and hangs down along the wire 22 and is provided with a trolley-wheel 43, which runs along the under side of the said wire 22. In the frameworks of the motor are also journaled the fore-and-aft wheels 44 44, which run upon the cable 21, and to the lower part of the frame are attached the grapple-hooks 45, which are adapted to carry the cargo—such as boxes, barrels, bales, ammunition, supplies, &c.

It will be observed that the cable 21 and current-wire 22 extend from the ship to the shore in substantially a horizontal line, there being a slight angle of elevation or depression at the ship end according to the condition of the tide. The interposition of the pontoon-supported poles between the ship and the poles upon solid foundation reduces the angle of this elevation or depression, and therefore the cable 21 under tension does not present any heavy grades to the motors or cars that are passed over the same.

Figure 2:
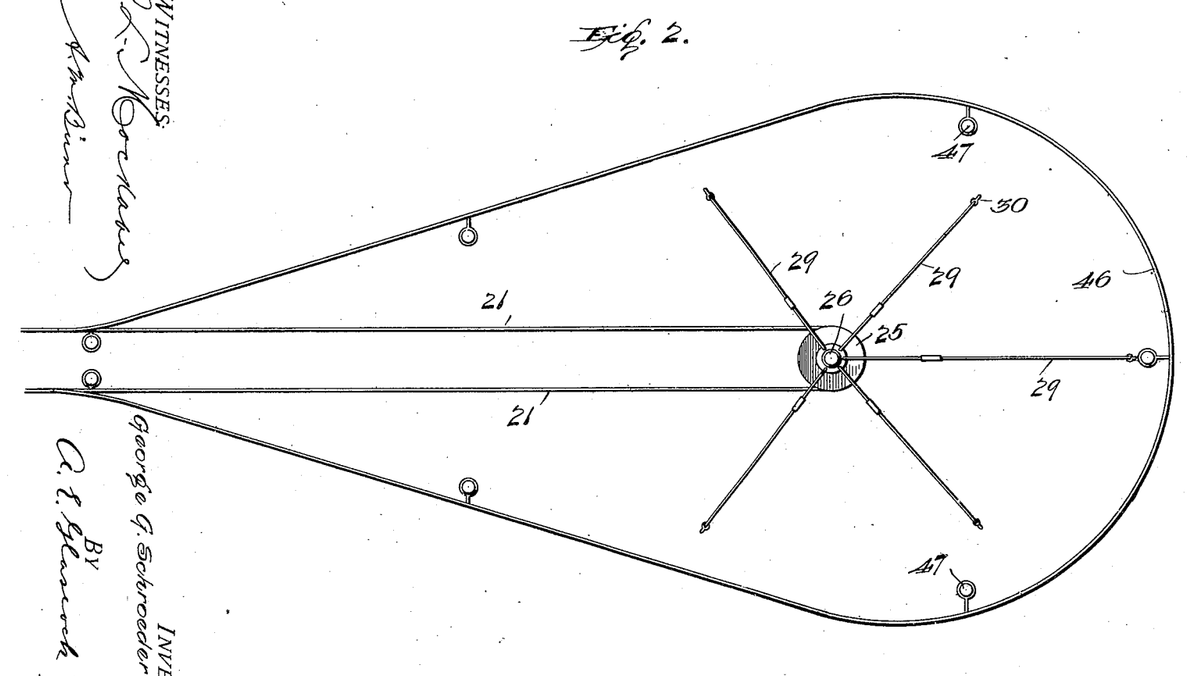
Fig. 2 is a top plan view of the shore end of the system.

For the purpose of stopping and unloading the cars when they reach the shore an elevated rod-track 46 is erected upon the poles 47. This rod-track describes a loop, as shown in Fig. 2, and both ends of the loop rest upon the cable 21, one on the incoming side thereof and the other on the outgoing side. Immediately under the rod-track 46 is located an insulated wire 48, which extends parallel to the rod-track 46. The wire 48 is for the purpose of guiding the trolley-wheel 43, while the motor and load are going around the rod-track. The insulation 49 is inserted between the ends of the wire 48 and the current-wire 22 at or near the points where they join. Consequently as soon as the trolley-wheel of a car passes over the insulation 49 the current is cut off from the motor of the car and the speed of the car is checked in ascending the incline of the elevated rod-section 46. Thus the car is brought to a state of rest when it is unloaded and may be loaded or sent back empty to the ship by pushing it along the track 46 until it strikes the decline, when by gravity it runs to the outgoing side of the cable 21, again takes the current from the wire 22, and moves to the ship.

Figures 3, 5:
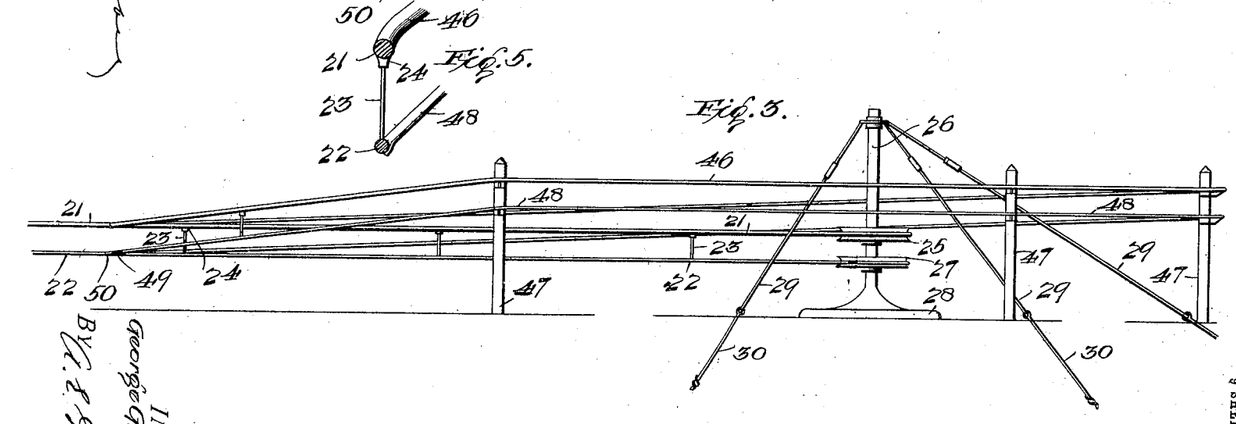
Fig. 3 is a side elevation of the shore end of the system.
Fig. 5 is a cross-sectional view of the same.
Figure 4:
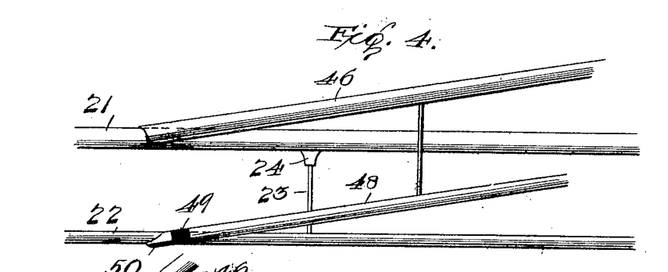
Fig. 4 is an enlarged detail of a connection provided between the cable and current-wire with an elevated terminal section.

Figs. 4 and 5 show detail views of the connections between the cable 21, rod 46, wire 22, and wire 48 at the points where they connect with each other. The lower end of the rod 46 is slightly grooved and rests upon the top cable 21, and the lower end of the wire 48 is attached to insulation 49, which is attached directly to or by an intermediate piece 50, brazed to the under side of the wire 22. The rod 46 and wire 48 then extend to one side as they elevate, so that the load carried by the car may clear the cable 21 and wire 22 as it is elevated.

Figure 6:
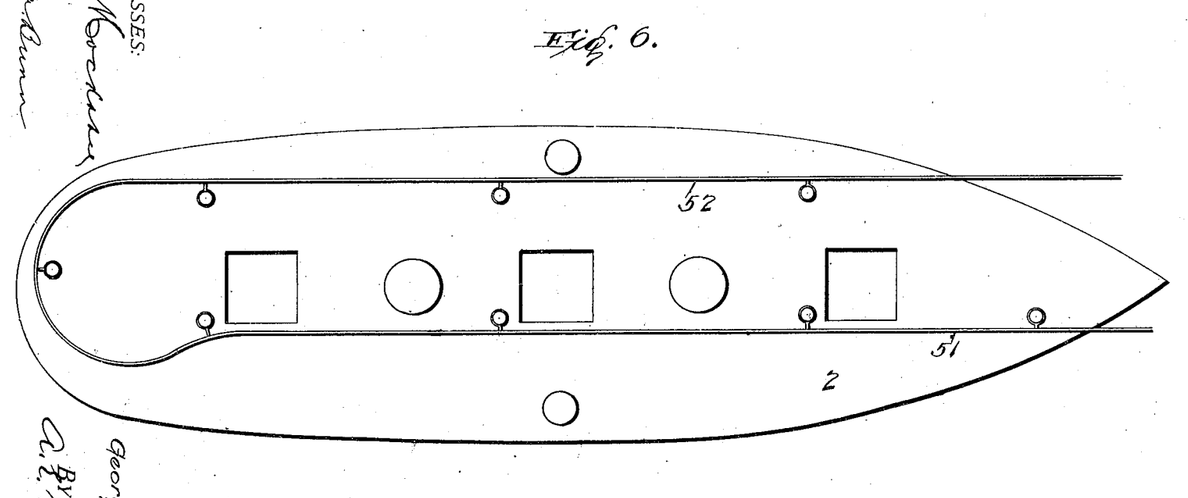
Fig. 6 is a top plan view of the ship end of the system.
Figure 7:
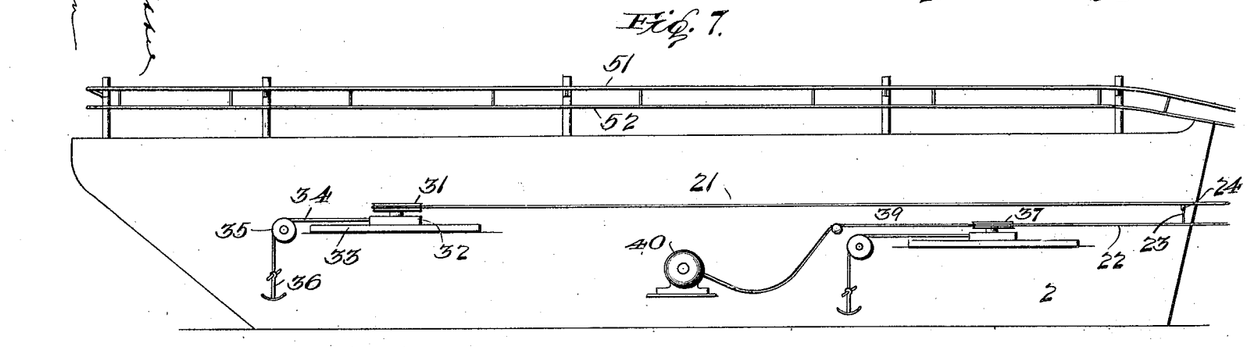
Fig. 7 is a side elevation of the ship end of the system.
Figure 8:
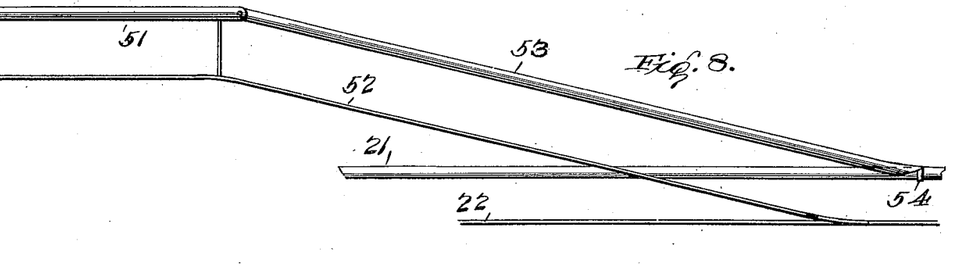
Fig. 8 is an enlarged detail view of the connection provided at the ship between the cable and current-wire and an elevated terminal section.
Figure 9:
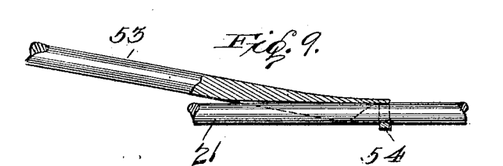
Fig. 9 is a side elevation, partly in section, showing the arrangement of the parts in such a connection.

At the ship end a similar elevated rod-track 51 is mounted upon the deck of the ship and has located under it a parallel guide-wire 52. This rod-track and guide-wire may pass around the deck of the ship, as indicated in Fig. 6, or adjusted in any suitable way to facilitate loading or unloading the cars aboard ships, boats, or crafts of any kind. The section 53 is preferably hinged at its upper end to the rod-section 51, and the lower end thereof is grooved, as shown in Fig. 9, and rests upon the cable 21. This construction permits the cable 21 to have a longitudinal movement and also compensates for the rise and fall of the same with the tide. To insure against displacement of the lower end of the section 53 from the cable 21, the said lower end is provided with a ring 54, which passes around the cable 21, but which the said cable may slip through.

Having described my invention, what I claim as new, and desire to secure by Letters Patent, is—

1. A system of the character as described consisting of an elevated flexible trackway connecting a ship or boat with the shore, track-supports resting upon solid foundations and sustaining the track from a point near the ship or boat to the shore, and track-supports resting upon floating foundations near the ship.

2. A system of the character as described consisting of an elevated trackway connecting a ship or boat with the shore, track-supports located in or upon the water and extending from the ship to the shore, and a tension means applied to said track.

3. A system of the character as described consisting of an elevated trackway connecting a ship or boat with the shore, track-supports resting upon solid foundations and sustaining the track from a point near the ship to the shore, track-supports resting upon floating foundations near the ship or boat, and a tension means applied to said track.

4. A system of the character as described consisting of an elevated trackway connecting a ship or boat with the shore, track-supports extending from the ship or boat to the shore, and a tension means located upon the ship and applied to said track.

5. A system of the character as described consisting of an elevated trackway connecting a ship or boat with the shore, said track being fixed at its shore end, track-supports extending from the ship or boat to the shore, and a tension means located upon the ship or boat and applied to said track.

6. A system of the character as described consisting of an elevated trackway connecting a ship or boat with the shore, track-supports extending from the ship or boat to the shore, and a tension means applied to said track, said trackway-supports permitting the track to move horizontally with relation thereto.

7. A system of the character as described consisting of an elevated trackway connecting a ship or boat with the shore, track-supports extending from the ship or boat to the shore, and having journaled wheels upon which the track rests, and a tension means applied to said track.

8. A system of the character as described consisting of an elevated trackway connecting a ship or boat with the shore, track-supports extending from the ship or boat to the shore, and a guy-cable extending from the ship or boat to the shore, and connecting the said track-supports.

9. A system of the character as described consisting of an elevated trackway connecting a ship or boat with the shore, a current-wire extending from the ship or boat to the shore, and being supported by said track in parallel position thereto.

10. A system of the character as described consisting of an elevated trackway connecting a ship or boat with the shore, a tension means applied to said track, a current-wire extending from the ship or boat to the shore parallel to said track, and a tension means applied to said current-wire.

11. A system of the character as described consisting of an elevated trackway connecting a ship or boat with the shore, a tension means located upon the ship or boat and applied to said track, a current-wire extending from the ship or boat to the shore parallel to said track, and a tension means located upon the ship or boat and applied to said current-wire.

12. A system of the character as described consisting of an elevated trackway connecting a ship or boat with the shore, said track being fixed at the shore end, a tension means located upon the ship or boat and applied to said track, a current-wire extending from the ship or boat to the shore parallel to said track, and being fixed at its shore end, and a tension means located upon the ship or boat and applied to said current-wire.

13. A system of the character as described consisting of an elevated continuous trackway extending from a ship or boat to the shore, and back to the ship or boat, and a tension device located upon the ship or boat and entering the loop described by said track, and adapted to keep the same taut.

14. A system of the character as described consisting of an elevated continuous trackway extending from a ship or boat to the shore and back to the ship or boat, a tension device applied to said track, a continuous current-wire extending parallel to said track from the ship or boat to the shore, and back to the ship or boat, and a tension device applied to said current-wire.

15. A system of the character as described consisting of an elevated trackway extending from a ship or boat to the shore in substantially a horizontal line, superimposed trackways located at the shore and upon the ship or boat, and connecting with the first said trackway.

16. A system of the character as described consisting of an elevated trackway extending from a ship or boat to the shore in substantially a horizontal line, superimposed trackways located at the shore and upon the ship or boat, each of the last said trackways describing a loop which connects at both its ends with the first said trackway.

17. A system of the character as described consisting of an elevated trackway, a superimposed trackway located over its terminals, both of the last said trackways describing loops and connecting at their ends with the first said trackway.

18. A system of the character as described consisting of two trackways, a superimposed trackway located over the terminal of the first said trackways, and describing a loop, one end of which connects with one of the first said trackways, and the other end of the loop with the other first said trackway.

19. A system of the character as described consisting of a trackway, a current-wire supported by said trackway and extending parallel therewith, a superimposed terminal trackway connecting with the first said trackway, a guide-wire extending parallel to the last said trackway, and connecting the current-wire, but being insulated therefrom.

20. In a system of the character as described, an elevated trackway, a trackway-support consisting of a pole or upright, a base therefor, arms hinged to said base and adapted to swing in alinement with the pole.

21. In a system of the character as described, an elevated trackway, a trackway-support consisting of a pole or upright, a base therefor, and arms hinged to said base.

22. In a system of the character as described, an elevated trackway, a trackway-support consisting of a pole or upright, a base therefor, and arms hinged to said base in such manner that they may swing down, but not up any higher than a substantially horizontal position.

23. In a system of the character as described, an elevated trackway, a trackway-support consisting of a pole or upright, a floating base therefor, and a means adapted to permit said floating base to rock and twist without rocking or twisting the pole.

24. In a system of the character as described, an elevated trackway, a trackway-support consisting of a pole or upright, a floating base therefor, and a means adapted to permit said floating base to rock or twist without rocking or twisting the pole consisting of a ball-and-socket joint, one member of which is attached to the pole, and the other member to the floating support.

In testimony whereof I affix my signature in presence of two witnesses.

GEORGE G. SCHROEDER.

Witnesses:
A. M. GORMAN,
J. W. McCULLEN.